(12) United States Patent
Allen et al.

(10) Patent No.: US 12,736,720 B2
(45) Date of Patent: Sep. 15, 2026

(54) METHOD AND SYSTEM WITH FRAGMENTED METASTRUCTURES FORMED WITH A PLURALITY OF METASURFACE ARRAYS

(71) Applicant: GEORGIA TECH RESEARCH CORPORATION, Atlanta, GA (US)

(72) Inventors: Kenneth Wayne Allen, Atlanta, GA (US); Daniel J.P. Dykes, Atlanta, GA (US); David W. Landgren, Atlanta, GA (US); Christopher Peterson, Atlanta, GA (US); David R. Reid, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 256 days.

(21) Appl. No.: 18/577,913

(22) PCT Filed: Jul. 20, 2022

(86) PCT No.: PCT/US2022/037735

§ 371 (c)(1),
(2) Date: Jan. 9, 2024

(87) PCT Pub. No.: WO2023/003961

PCT Pub. Date: Jan. 26, 2023

(65) Prior Publication Data

US 2024/0310561 A1 Sep. 19, 2024

Related U.S. Application Data

(60) Provisional application No. 63/223,603, filed on Jul. 20, 2021.

(51) Int. Cl.
*G02B 5/12* (2006.01)
*G02B 1/00* (2006.01)

(52) U.S. Cl.
CPC ............... *G02B 5/12* (2013.01); *G02B 1/002* (2013.01)

(58) Field of Classification Search
CPC ............ G02B 5/12; G02B 1/002; H01Q 3/46; H01Q 15/0086
See application file for complete search history.

(56) References Cited

U.S. PATENT DOCUMENTS 2,908,002 A 10/1959 Van Atta
3,712,706 A 1/1973 Stamm
(Continued)

FOREIGN PATENT DOCUMENTS

WO WO-2019033140 A1 * 2/2019 .......... H01Q 15/242

OTHER PUBLICATIONS

Wong, A. M. H., Christian, P., & Eleftheriades, G. V. (2018). Binary Huygens' Metasurfaces: Experimental Demonstration of Simple and Efficient Near-Grazing Retroreflectors for TE and TM Polarizations. IEEE Transactions on Antennas and Propagation, 66(6), 2892-2903.

(Continued)

*Primary Examiner* — Mariam Qureshi
(74) *Attorney, Agent, or Firm* — Meunier Carlin & Curfman LLC

(57) ABSTRACT

An exemplary method and system are disclosed comprising retroreflective metastructures formed with a plurality of metasurface arrays configured to destructively cancel or interfere, in part, with one another to reduce specular mode associated scattering or reflection. In some embodiments, the retroreflective metastructures are formed by a combination of metasurfaces with different lattice spacings that can exhibit enhanced bandwidth and angular range at near-grazing angles to provide enhanced retroreflective electromagnetic responses.

20 Claims, 18 Drawing Sheets

(56) References Cited

U.S. PATENT DOCUMENTS

| | | | | |
|---|---|---|---|---|
| 8,228,591 | B1 * | 7/2012 | Towers | G01S 17/04 359/275 |
| 10,727,601 | B1 * | 7/2020 | Akselrod | H01Q 15/0053 |
| 2020/0025619 | A1 * | 1/2020 | Almasri | G01J 5/046 |
| 2020/0028272 | A1 * | 1/2020 | Green | H01Q 15/0053 |
| 2021/0103141 | A1 * | 4/2021 | Chen | G02B 21/002 |

OTHER PUBLICATIONS

International Search Report and Written Opinion received in PCT/US2022/037735 mailed Oct. 26, 2022.

Ra'Di et al., "Reconfigurable Metagratings" ACS Photonics 2018, 5, 5, 1779-1785; Mar. 12, 2018; entire document, especially abstract, Fig. 3a-3d; p. 6, p. 10, p. 15 [online] <https://pubs.acs.org/doi/abs/10,1021/acsphotonics.7b01528>.

Arbabi et al., "Planar metasurface retroreflector" Nature Photonics vol. 11, pp. 415-420 (2017); Jun. 19, 2017; entire document, especially abstract, Fig. 3a, Fig. 3 caption; p. 4 (online) <https://www.nature.com/articles/nphoton.2017.96>.

* cited by examiner 115
123
100a
B
A
104
107
108
110
106b
102
106a
109
114a
114b
118a
118b
116
112
$\theta_r$
120
122

816
814
818
812
810
808
806

METHOD AND SYSTEM WITH FRAGMENTED METASTRUCTURES FORMED WITH A PLURALITY OF METASURFACE ARRAYS

RELATED APPLICATION

This application is a national stage application filed under 35 U.S.C. § 371 of PCT/2022/037735 filed Jul. 20, 2022, entitled "Metastructures Formed Through a Plurality of Metasurface Arrays for Enhanced Retroreflective Electromagnetic Responses," which claims priority to, and the benefit of, U.S. Provisional Patent Application No. 63/223,603, filed Jul. 20, 2021, entitled "Metastructures Formed Through a Plurality of Metasurface Arrays for Enhanced Retroreflective Electromagnetic Responses," the disclosures of which are incorporated by reference herein in their entireties.

TECHNICAL FIELD

This disclosure is directed to an antenna device or optical or RF tagging device and their associated structures, in particular for retroreflection.

BACKGROUND

The ability to control higher-order spatial harmonics reflected from a surface is beneficial for a number of applications, e.g., in antenna structures, in optical or RF tagging, among others. Retroreflection is the reflection of light back to the source.

Conventional retroreflectors, e.g., via glass beads or micro prisms, often provides strong retroreflection at near-normal angles in which the structures that produce the near-grazing retroreflection are typically resonant but have narrow bandwidth over other portions of the angular range, particularly for steep angles of incidence. New classes of metamaterials have recently been made known but are still preliminary in their designs and usages in the control of spatial harmonics.

There are nevertheless benefits to improving retroreflective responses.

SUMMARY

An exemplary method and system are disclosed comprising retroreflective metastructures formed with a plurality of metasurface arrays having fragmented or pixelated metasurfaces configured to destructively cancel or interfere, in part, with one another to reduce specular mode associated scattering or reflection.

In some embodiments, the retroreflective fragmented or pixelated array metastructures are formed by a combination of metasurfaces with different lattice spacings that can exhibit enhanced bandwidth and angular range at near-grazing angles to provide enhanced retroreflective electromagnetic responses. Traditional retroreflectors function at near-normal angles, and structures that produce near-grazing retroreflection are typically resonant and thus have a narrow bandwidth and angular range. The exemplary retroreflective metastructures may use a combination of multiple resonant metasurfaces to increase both the retroreflective bandwidth and angular range while maintaining reasonably high efficiency and dual-polarization. This may greatly reduce the angular precision necessary to produce a retroreflective response. The exemplary retroreflective metastructures can be used in a number of applications, including RFID, optical or RF tagging, and smart surfaces for 5G.

In an aspect, an apparatus (e.g., RFID tag, optical or RF tag, smart surface) is disclosed comprising a substrate comprising a retroreflective metasurface comprising one or more unit cells each having two or more fragmented or pixelated-array metasurfaces, including a first fragmented or pixelated-array metasurface and a second pixelated-array metasurface, the first fragmented or pixelated-array metasurface and the second fragmented or pixelated-array metasurface being configured to reflect a signal wavefront at a pre-defined range of angle of incidence to generate a scattered wavefront having a resulting first scattered wavefront portion and a second scattered wavefront portion that destructively cancel or interfere, in part, of one another to reduce specular mode of the scattered wavefront, wherein the first fragmented or pixelated-array metasurface has a first pattern having a first associated periodicity, and wherein the second fragmented or pixelated-array metasurface has a second pattern having a second associated periodicity; and a ground plane coupled to the substrate, the ground plane having a reflective surface to the signal wavefront.

In some embodiments, the first fragmented or pixelated-array metasurface includes a fragmented or pixelated pattern comprising a plurality of fragment or pixel elements conforming to an array. The pixel elements have either a first reflective surface (e.g., reflective) or a second reflective surface (e.g., non-reflective or reflective to a lesser degree than the first reflective surface).

In some embodiments, the first fragmented or pixelated-array metasurface and the second fragmented or pixelated-array metasurface are located on a same plane on the substrate.

In some embodiments, the substrate is transparent to the signal wavefront, wherein the first fragmented or pixelated-array metasurface is located on a first surface of the substrate (e.g., at a bottom surface of the substrate contacting the ground plane), and wherein the second fragmented or pixelated-array metasurface is located on a second surface of the substrate (e.g., at a top surface).

In some embodiments, the first surface is parallel to the second surface, and the first fragmented or pixelated-array metasurface overlaps with the second fragmented or pixelated-array metasurface for the pre-defined range of angle of incidence.

In some embodiments, the first surface is orthogonal to the second surface.

In some embodiments, the first fragmented or pixelated-array metasurface has a first retroreflective frequency characteristic and a transparent frequency characteristic, and the second fragmented or pixelated-array metasurface has a second retroreflective frequency characteristic.

In some embodiments, the first fragmented or pixelated-array metasurface and the second fragmented or pixelated-array metasurface each has a size defined by wavelength parameter (λ) and an angle of incidence (θr) (e.g., size $d=\lambda/2 \sin(\theta r)$).

In some embodiments, the unit cells are configured for dual-polarized retroreflection.

In some embodiments, the unit cells are configured for single-polarized retroreflection.

In some embodiments, the unit cells are configured for dual-band retroreflection, including a first retroreflection frequency range having a first center frequency and a second retroreflection frequency range having a second center frequency.

In some embodiments, the reduced specular mode of the scattered wavefront increases the bandwidth and angular range of retro-reflectivity of the apparatus.

In some embodiments, the first fragmented or pixelated-array metasurface and the second fragmented or pixelated-array metasurface collectively provide an overall response of the retroreflective metasurface as a weighted average of the first fragmented or pixelated-array metasurface and the second fragmented or pixelated-array metasurface.

In some embodiments, the first pattern of the first fragmented or pixelated-array metasurface and the second pattern of the first fragmented or pixelated-array metasurface each comprises a binary Huygens metasurface.

In some embodiments, the apparatus is configured as a passive or active radio-frequency identification (RFID) tag, optical or RF tagging device (e.g., optical or RF target for localization or unmanned vehicle application), or a smart surface for wireless communication (e.g., 5G, Wifi).

In some embodiments, the apparatus further includes an electrical circuit component (e.g., RFID device, antenna system) located in proximity to the retroreflective metasurface.

In some embodiments, the first fragmented or pixelated-array metasurface and the second fragmented or pixelated-array metasurface are configured for steep angle operation, broad- or multi-band operation, dual-polarized operation, or low CSWAP (cost, size, weight, and power) operation.

In some embodiments, the first fragmented or pixelated-array metasurface and the second fragmented or pixelated-array metasurface are configured to reflect the signal wavefront having visible light in a visible light portion of the EM spectrum.

In some embodiments, the first fragmented or pixelated-array metasurface and the second fragmented or pixelated-array metasurface are configured to reflect the signal wavefront having a frequency in an RF portion of the EM spectrum.

In some embodiments, the pre-defined range of angle of incidence is greater than 0 degrees and less than 90 degrees from normal, and the first associated periodicity and the second associated periodicity establish an angle at which retroreflection is most efficient for a given frequency.

In another aspect, a system is disclosed comprising the above-discussed apparatus. In some embodiments, the system further includes a controller configured to interrogate the apparatus.

In another aspect, a method is disclosed for fabricating the above-discussed apparatus. In some embodiments, the method includes defining a retroreflection angle of interest for a set of unit cells; partitioning unit cell into two or more parts; modeling reflected fields from the two subcells, and computing a relative phase value between the subcell reflections of a current pattern; varying patterns of the two subcells until the determined relative phase of the current pattern of the two subcells are 180 degrees; and verifying design performance for the two subcells.

BRIEF DESCRIPTION OF THE DRAWINGS

The accompanying drawings, which are incorporated in and constitute a part of this specification, illustrate embodiments and, together with the description, serve to explain the principles of the methods and systems.

DETAILED SPECIFICATION

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the nth 10 reference in the list. All references cited and discussed in this specification are incorporated herein by reference in their entireties and to the same extent as if each reference was individually incorporated by reference.

Figure 1:
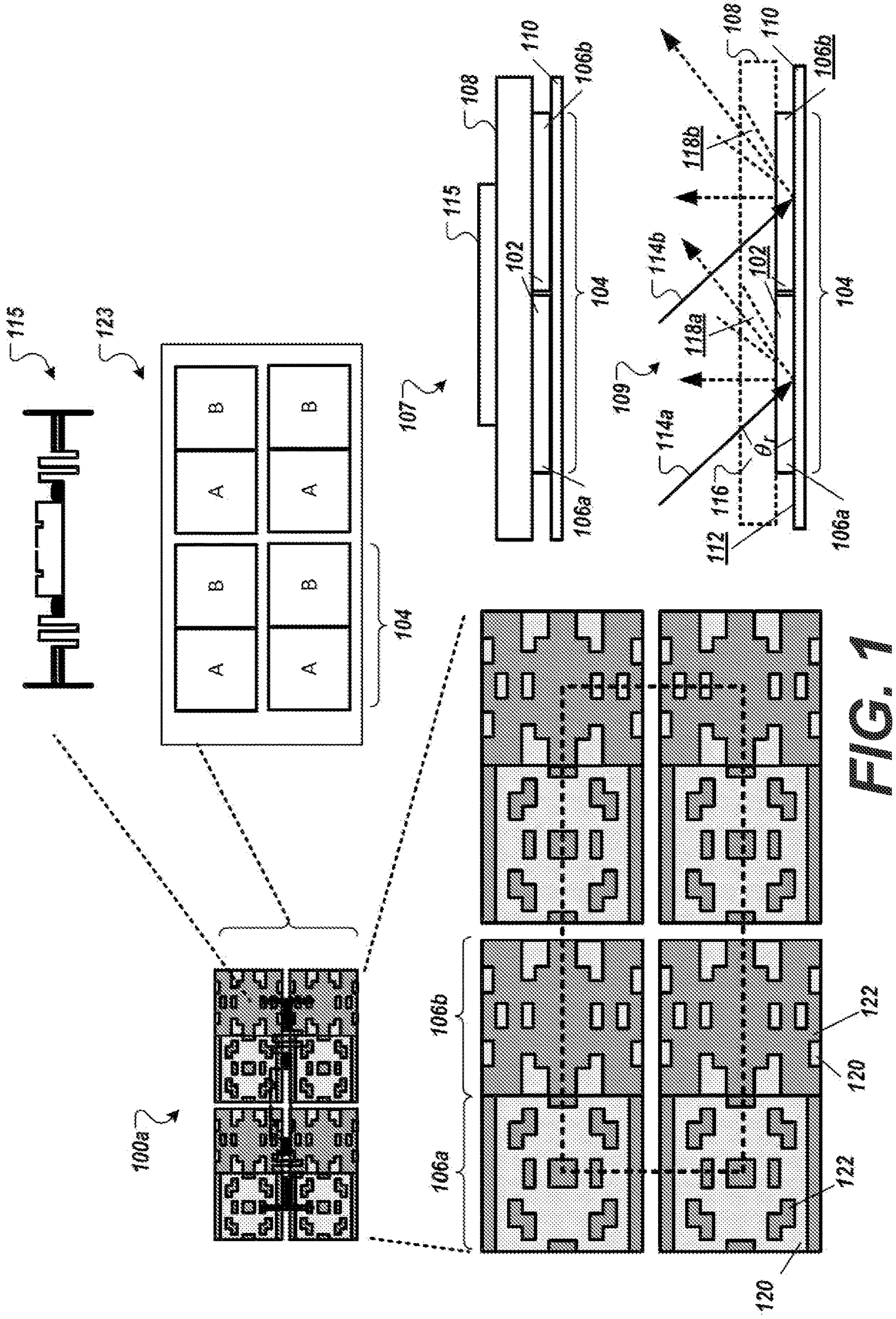
FIG. 1 shows an example retroreflective apparatus comprising a retroreflective metasurface comprising fragmented or pixelated-array metasurfaces in accordance with an illustrative embodiment.

FIG. 1 shows an example retroreflective apparatus 100 (shown as 100*a*) comprising a retroreflective metasurface 102 defined by a unit cell 104 having a first fragmented or pixelated-array metasurface portion 106 (shown as 106*a*) and a second fragmented or pixelated-array metasurface portion 106 (shown as 106*b*) in accordance with an illustrative embodiment.

In the example shown in FIG. 1, in diagram 107, the retroreflective apparatus 100*a* includes a substrate 108 comprising the retroreflective metasurface 102. The first fragmented or pixelated-array metasurface 106*a* has a first pattern having a first associated periodicity, and the second fragmented or pixelated-array metasurface has a second pattern having a second associated periodicity. The first fragmented or pixelated-array metasurface 106*a* and the second fragmented or pixelated-array metasurface are configured to operate with a ground plane 110 operatively coupled to the substrate 108. The ground plane has a reflective surface 112 to a signal wavefront 114 (shown as 114*a*, 114*b*). The retroreflective apparatus 100 (e.g., 100*a*) may include a circuit element 115 that may be fabricated on or next to the retroreflective metasurface 102.

In diagram 109, the first fragmented or pixelated-array metasurface and the second fragmented or pixelated-array metasurface (106*a*, 106*b*) are configured to reflect the signal wavefront 110 at a pre-defined range of angle of incidence 116 (shown as "Or" 116) to generate a scattered wavefront 118 having a resulting first scattered wavefront portion (shown as 118*a*) and a second scattered wavefront portion (shown as 118*b*) that destructively cancel or interfere, in part, of one another to reduce the specular mode of the scattered wavefront 118.

The term "retroreflection," as used herein, refers to the reflecting back of an electromagnetic wave in the direction of incidence. Retro-reflectivity refers to the ability to do the same. By canceling or interfering with the scattered wavefront at the different fragmented or pixelated-array metasurfaces, e.g., to reduce specular mode, the pixelated-array metasurfaces may increase both the retroreflective bandwidth and angular range of the device (e.g., 100, 100*a*, etc.) and/or while maintaining or increasing transmission efficiency and polarization of the overall application. Overall, the improved or enhanced retroreflection due to the fragmented or pixelated-array metasurfaces may reduce the angular precision required to produce a retroreflective response while improving overall system performance.

The term "pixelated-array" or "fragmented," as used interchangeably herein, refers to a metasurface that includes a fragmented or pixelated pattern comprising a plurality of fragmented or pixel elements conforming to an array in which each pixel element either has (i) a reflective surface or the first type of reflective surface or (ii) a non-reflective surface or the second type of reflective surface of lesser degree to the first type of reflective surface. The array may comprise a set of square or rectangular elements arranged in a grid of regularly spaced horizontal and vertical lines. In alternative embodiments, the square or rectangular elements may be arranged in (i) a grid of regularly spaced horizontal or vertical lines or (ii) a grid having regularly spaced elements uniformly offset from one another. In other alternative embodiments, rather than squares or rectangles, the array may comprise a set of rhomboid elements, triangular elements, or circular elements. In some embodiments, the reflective surface may have the same property across all the pixel elements, and the non-reflective surface may also have the same property across all the non-pixel elements. In other embodiments, the reflective surface may vary in properties, e.g., in the degree of reflectivity, across the fragmented or pixelated array.

The fragmented or pixelated array metasurface provides a flexible configuration for the design of sub-unit patterns of the metasurface that can be optimized for various retroreflection angles of operation.

In the example shown in FIG. 1, the fragmented or pixelated-array metasurface (106*a*, 106*b*) comprises a set of square elements configured in a grid of regularly spaced horizontal and vertical lines. The fragmented or pixelated-array metasurface includes a set of pixel elements having either the first type of reflective surfaces 120 or the second type of reflective surfaces 122. FIG. 2C shows an enlarged image of the same (106*a*, 106*b*) superimposed with a grid of regularly spaced horizontal 224 and vertical lines 226.

Referring to FIG. 1, the fragmented or pixelated-array metasurface (106*a*, 106*b*) is arranged in a binarized Huygen metasurface comprising a repeating set of unit cells 104. In some ways, each pixelation or fragmentation of the fragmented or pixelated-array metasurface may also be considered a binarized Huygen metasurface. Nevertheless, regardless of the characterization of the design in such frameworks, there are two or more levels of patterns that are employed in the fragmented or pixelated-array metasurface: a macro-pattern among the unit cells and a sub-pattern within the unit cell.

In the example shown in FIG. 1, in diagram 123, the unit cells 104 are arranged in an "A-B-A-B" configuration. Other configurations may be employed, such as the "A-B-B-A" configuration. In some embodiments, the unit cells may include three or more different fragmented or pixelated-array metasurfaces, e.g., having "A-B-C-A-B-C" or "A-B-C-C-B-A" configurations. The unit cells may be arranged in a 2×2 configuration, e.g., [A, B] in row 1 and [B, A] in row 2. The 2×2 unit cell configuration may then be repeated.

A circuit element 115 that may be fabricated on or next to the retroreflective metasurface 102 may include antennas and other inductive or capacitive structures of an RFID circuit, wireless communication system, and the like. Retroreflection is beneficial for RFID devices and applications in having directionality, via the retroreflection, of an interrogated signal provided from an RFID scanner, for example, to the RFID tag and having the retroreflected signal return to the source. Retroreflective responses in a different direction other than normal can provide a larger window of operation of the device, i.e., the angle that the device can operate. Because of the increased transmission efficiency and polarization, the sensitivity of the device can be improved, which may allow for more compact devices to be fabricated.

The exemplary fragmented or pixelated-array metasurface can be used in a variety of fields relating to communications. Retroreflecting surfaces can, for example, be used in optical or RF tagging for UAVs and other applications, RFID, optical communications, calibration target, and smart surfaces for 5G. In particular, the exemplary fragmented or pixelated-array metasurface can be used to provide steep angle performance, broad- or multi-band performance, dual polarized, low CSWAP (cost, size, weight, and power), that are amenable to conformal applications, and can be applied to outer mold line of aerodynamic structures allowing retrofit on existing platforms.

The circuit element 115 may be fabricated on the same substrate (e.g., PCB or flexible printed circuit board) as the metasurfaces. In some embodiments, the circuit element 115 is fabricated on a different substrate which may be formed on the metasurface assembly, or it may separately fabricated and attached to the metasurface assembly. In some embodiments, the metasurface assembly may be formed on a fabricated circuit element 115.

Example Fragmented or Pixelated-Array Metasurface Configurations

Fragmented or pixelated-array metasurface may be individually designed for either single- or dual-polarized retroreflection operation as well as dual-band retroreflection operation. Retroreflective metasurfaces (multi-periodic retroreflective metasurfaces) may have multiple periodic metasurfaces that are combined into a hybrid metastructure such that the bandwidth and angular range of retro-reflectivity are increased. To design the multi-periodic retroreflective metasurfaces, multiple periodic metasurfaces may be individually designed for either single- or dual-polarized retroreflection, and the angle in which retroreflection is most efficient for a given frequency is determined by the periodicity of the metasurface. The multiple periodic metasurfaces may then be combined to provide a single unified structure in which the metasurfaces with different periodicities can collectively produce retroreflection at varied angles (e.g., a structure that can exhibit near-grazing retroreflection at different angles and frequencies).

Figure 2A:
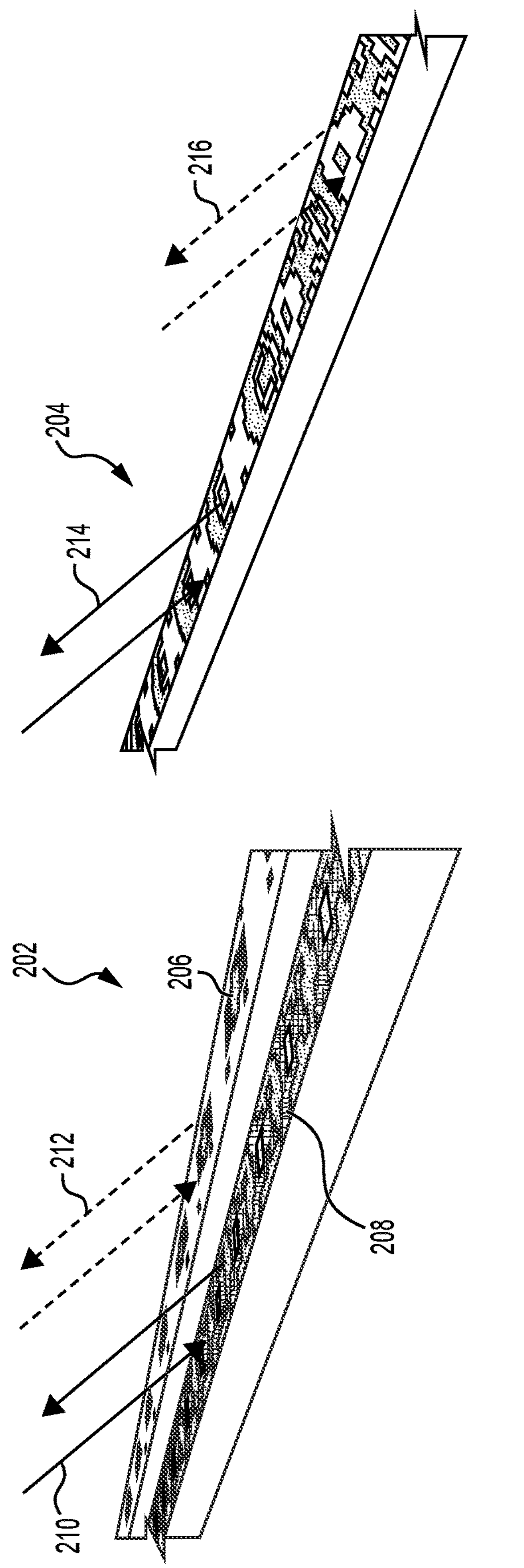
FIGS. 2A and 2B each show an example retroreflective hybrid metasurface structure comprising a retroreflective metasurface configured with fragmented or pixelated-array metasurfaces and associated performance characteristics in accordance with an illustrative embodiment.
Figure 2B:
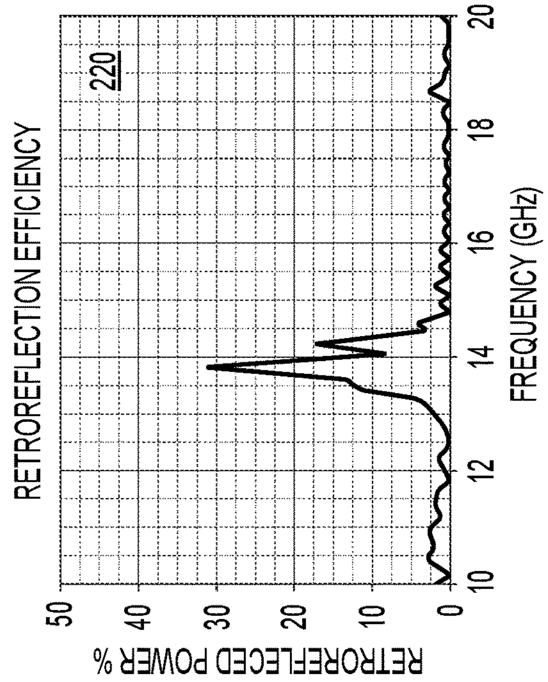
Figure 2B:
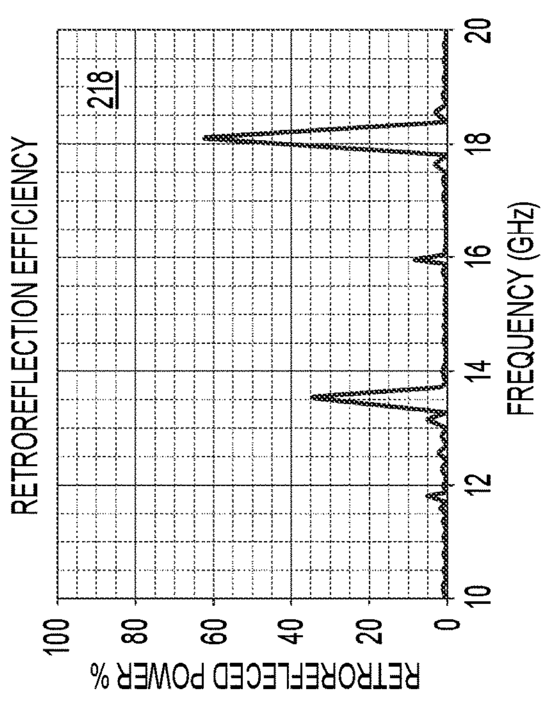
Figure 2B:
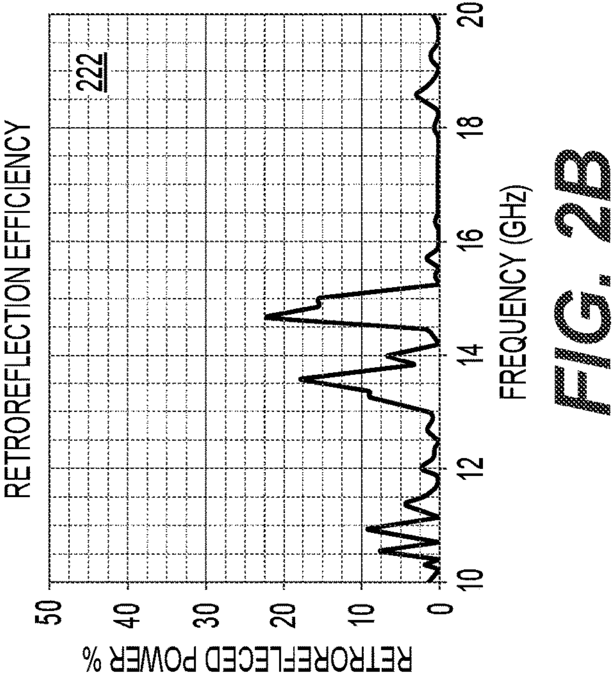
Figure 2C:
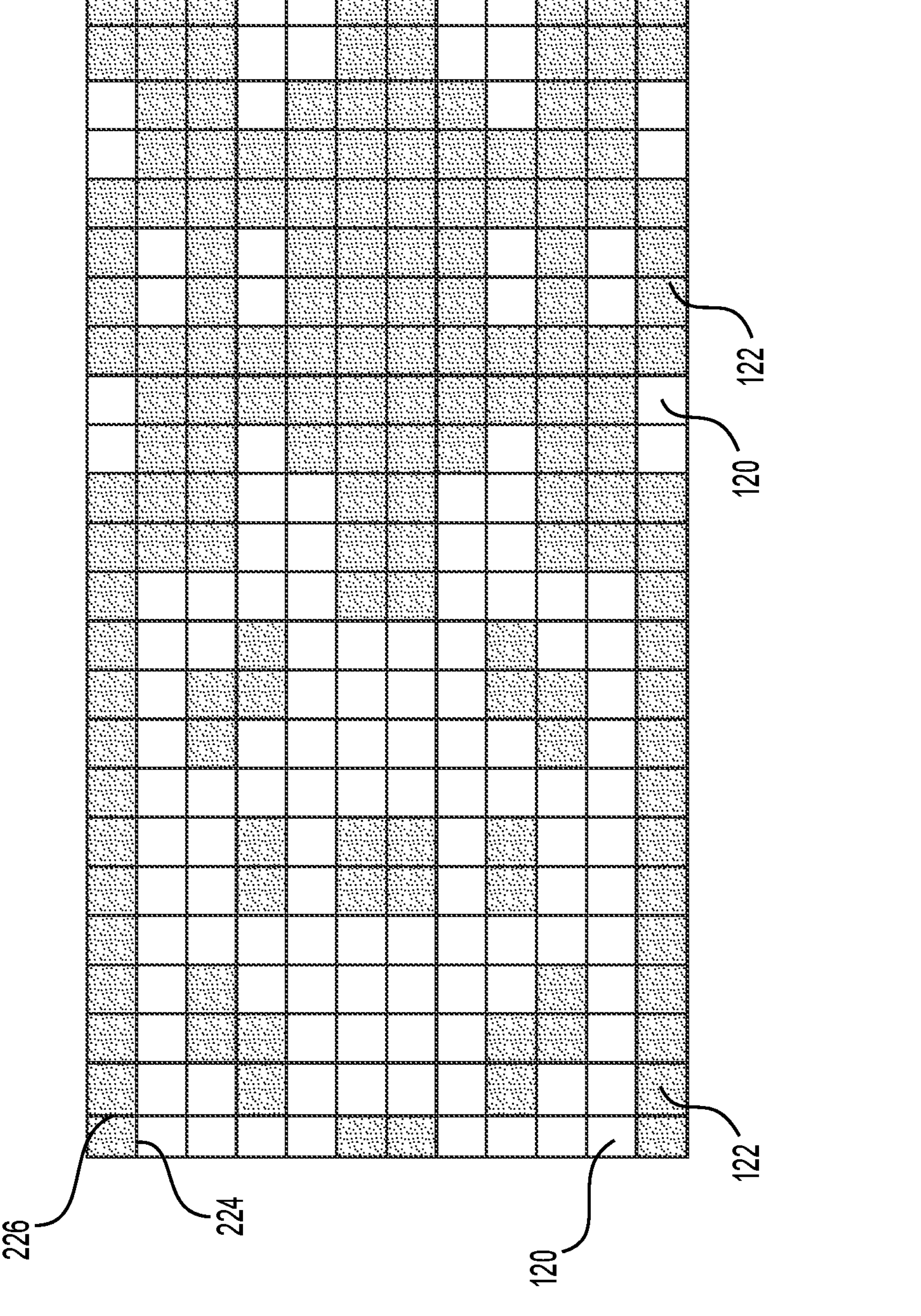
FIGS. 2C-2G each shows an example configuration of the fragmented or pixelated-array metasurfaces in accordance with an illustrative embodiment.

FIGS. 2A and 2B show an example retroreflective hybrid metasurface structure in accordance with an illustrative embodiment. FIG. 2A shows the fragmented or pixelated-array retroreflective hybrid metasurface structure in a stacked configuration (202) and side-by-side configuration (204). In a stacked retroreflective hybrid metasurface configuration (202), the top layer 206 is made to be transparent at one frequency (210) and retroreflective (212) at another frequency. The bottom layer 208 then functions as the ground plane, and at the frequency (212) that the top layer 206 is retroreflective, and it (208) is retroreflective at the frequency (210) that the top layer (206) is transparent. In this configuration, the hybrid metasurface structure behaves as a retroreflector at two independent frequencies (and potentially angles), and the entire surface area of the metastructure is used for both frequencies of operations, allowing for high efficiency. This configuration may be particularly useful for dual-band operation because the top layer can then be both retroreflective at one operating frequency and transparent at another.

In the example, the surface of the top layer (206) may be parallel to the surface of the bottom layer (208). The fragmented or pixelated-array subcells may overlap for the pre-defined range of angle of incidence.

The side-by-side retroreflective hybrid metasurface configuration (204) may be more straightforward to construct and more flexible than the stacked configuration but may be less efficient because the percentage of surface area used by each retroreflector is relatively less compared to the configuration of FIG. 2A. In this configuration, each metasurface can act independently, and metasurfaces of different periodicities (shown as 214, 216) can then be mixed together to provide an overall response that is approximately the weighted average of the component metasurfaces. This configuration is flexible and can be used for both dual-band and wideband operation. The multiple fragmented or pixelated-array metasurfaces may be fabricated on the same plane. In other configurations, the two planes may be offset to one another.

FIG. 2B shows simulated retroreflective efficiency as a function of frequency for both the stacked configuration (202) and side-by-side configuration (204). Plot 218 shows simulation results comprising retroreflection efficiency for a stacked retroreflective hybrid metasurface (e.g., retroreflector) configured for dual-frequency operation. Plot 220 shows simulation results comprising retroreflection efficiency for a side-by-side retroreflective hybrid metasurface (e.g., retroreflector) with the wideband operation. Plot 222 shows simulation results comprising retroreflection efficiency for a side-by-side retroreflective hybrid metasurface (e.g., retroreflector) with the dual-frequency operation.

Figure 2E:
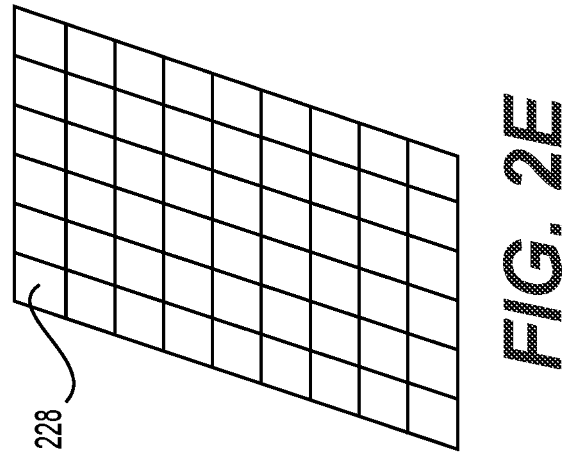
Figure 2D:
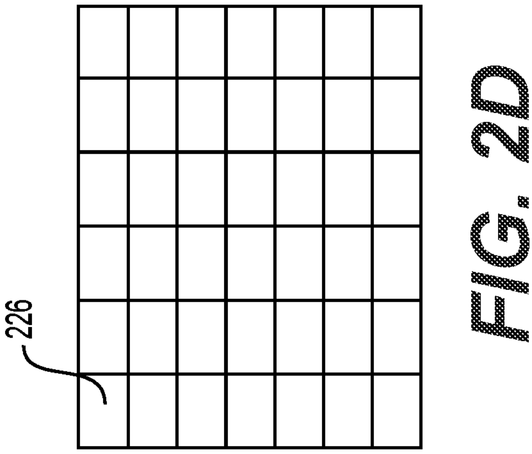

FIGS. 2C-2G show examples of additional fragmented or pixelated-array metasurface configurations. FIG. 2C shows a unit cell (e.g., 104) of a retroreflective metasurface comprising 2 arrays, each comprising a set of square elements arranged in a grid of regularly spaced horizontal and vertical lines. FIG. 2D shows each array of the unit cell comprising a set of rectangular elements 226 arranged in a grid of regularly spaced horizontal and vertical lines FIG. 2E shows the elements (set of rhomboid elements 228) configured in a grid having regularly spaced horizontal or vertical lines in combination with an angled line.

Figure 2G:
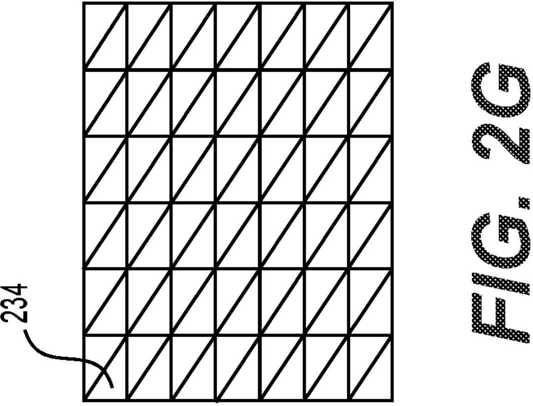
Figure 2F:
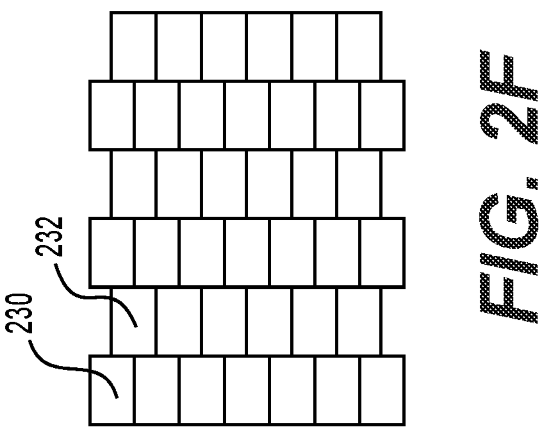

FIG. 2F shows the elements 230 (e.g., square or rectangular elements 230) being arranged in a grid having regularly spaced elements uniformly offset to at least one other element 232.

FIG. 2G shows each array of the unit cell comprising a set of triangular elements 234 arranged in a grid of regularly spaced horizontal and vertical lines

Method of Fragmented or Pixelated-Array Metasurface Generation

Figure 3:
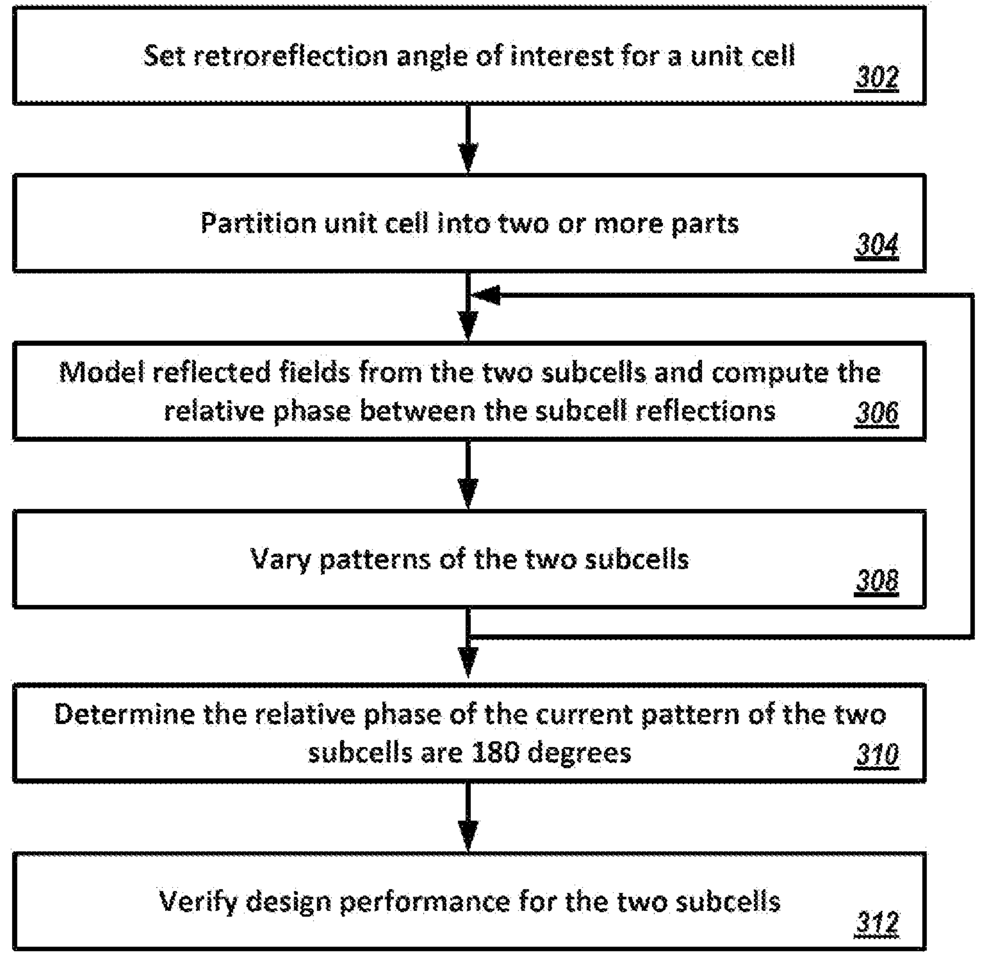
FIG. 3 shows an example method of generating a retroreflective metasurface comprising fragmented or pixelated-array metasurfaces in accordance with an illustrative embodiment.

FIG. 3 shows an example method 300 of generating a retroreflective metasurface (e.g., 102) comprising a unit cell (e.g., 104), each having two or more fragmented or pixelated-array metasurface portions in accordance with an illustrative embodiment.

The size of the elements in the arrays (the unit cells) may be specified to allow two modes to be available for energy to be scattered into: the specular mode (m=0) and retroreflective mode (m=−1). These unit cells are then subdivided in half, and the pattern for the top-layer copper of each half-cell is co-designed such that the reflection of the m=0 mode is 180° out of phase at the angles and frequencies of interest. This condition forces the m=0 mode to be suppressed, and because of the periodicity of the structure, only the m=−1 mode is available.

In some embodiments, the retroreflective metasurface may be based on binary Huygens metasurfaces as described in [1]. Pixelation and design constraints to destructively cancel or reduce the specular mode of the scattered wavefront may be performed.

Referring to FIG. 3, Method 300 may first include setting or defining (302) a retroreflection angle of interest θr for a unit cell (e.g., 104) of a retroreflective metasurface (e.g., 102). The angle θr may be defined per Equation 1:

$$d = \frac{\lambda}{\sin(\theta_r)} \quad \text{(Eq. 1)}$$

In which d is the size or length of the unit cell, λ is the signal wavelength of interest, and θr is the desired retroreflection angle (also referred to herein as a pre-defined range of angle of incidence). The pre-defined range of angle of incidence may be greater than 0 degrees and less than 90 degrees from normal (e.g., angle perpendicular to the metasurface plane). The size or length d also defines the periodicity of the unit cell. Indeed, per Equation 1, the periodicity of the unit cell establishes an angle at which retroreflection is most efficient for a given frequency.

Method 300 then includes partitioning (304) the unit cell (e.g., 104) into two or more parts. In some embodiments, the unit cell is defined as d/2. FIG. 4C shows an example unit cell 402 with the metallization pattern shown in FIG. 1.

Method 300 then includes modeling (306) the reflected fields from the two subcells and computing (also shown as 306) the relative phase between the subcell reflections. The modeling (306) may be performed by modeling the reflected field from the two subcells separately using a computational electromagnetics (CEM) tool such as Finite-Difference Time-Domain (FDTD) tool that performs numerical simulations. From the modeled reflected field, the relative phase between the subcell reflections is then calculated.

Figure 4A:
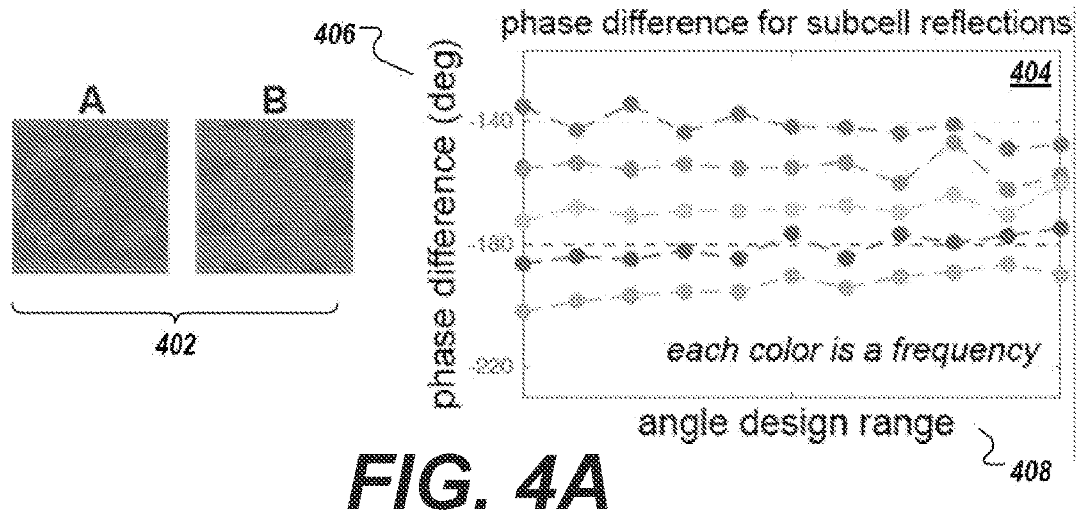
FIGS. 4A and 4B each shows operational characteristics of the retroreflective metasurface of FIG. 1 in accordance with an illustrative embodiment.
Figure 4B:
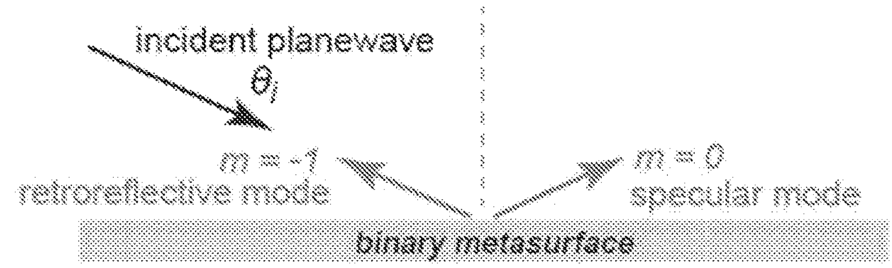
Figure 4B:
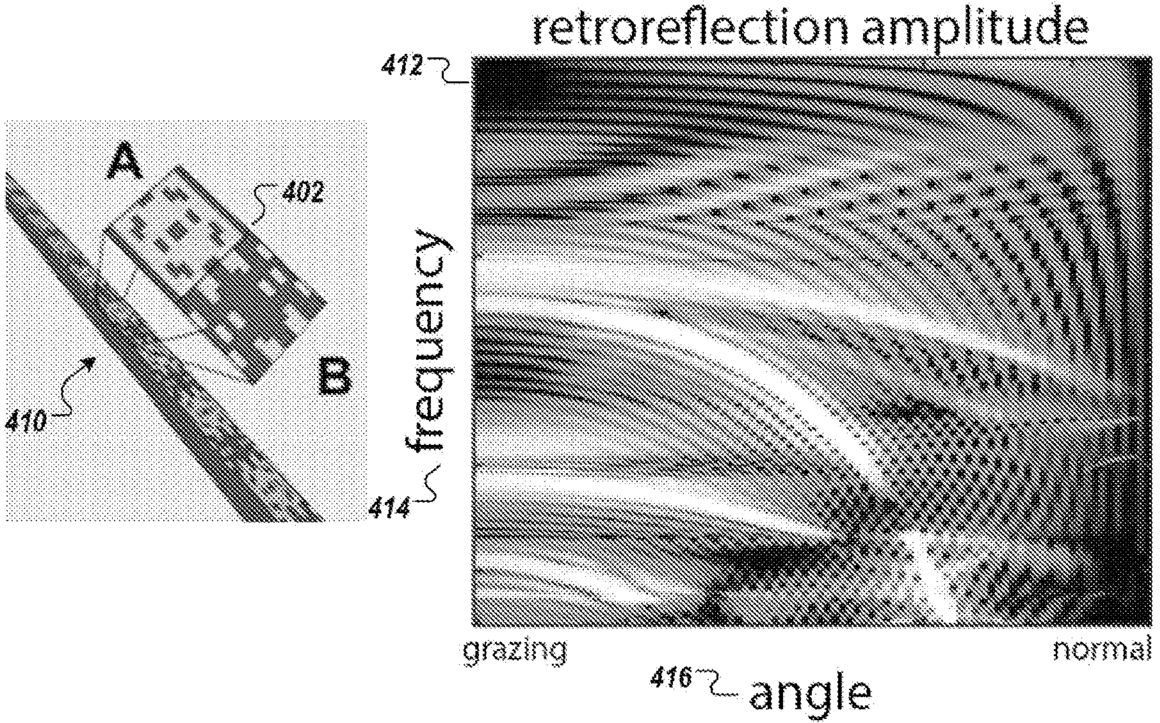

Method 300 then includes determining (310) whether the relative phase of the two subcells is 180 degrees. As noted above, this condition forces the specular mode (m=0) to be suppressed, and because of the periodicity of the structure, only the retroreflection mode (m=−1) is available. FIGS. 4A and 4B each shows operational characteristics of the example retroreflective metasurface of FIG. 1 in accordance with an illustrative embodiment. In FIG. 4A, plot 404 shows that different phase differences 406 may be determined for a given incident angle 408 for the pattern 402.

If the 180-degree relative phase condition is not met, method 300 includes varying (308) the two subcells with a different metallization pattern. In some embodiments, the prior phase metric is fed into an optimizer that then varies the current metallization pattern in each subcell to a new metallization pattern. In some embodiments, the optimizer is configured to generate or employ a random pattern for one quadrant of one of the subcells. The pattern may then be repeated and transposed to form the subcell. The process is then repeated for the second subcell.

The operation of modeling (306) the reflected fields of the two subcells and varying (308) the two subcells with a different metallization pattern may be repeated until the relative reflection phase between the subcells is 180 degrees (per 310).

Method 300 may then include verifying (312) the design performance for the two subcells. In some embodiments, operation 312 may include combining the subcells in a repeating pattern to form a CEM model. The CEM model is then assessed to verify that the desired retroreflection performance has been achieved. In some embodiments, the CEM model is evaluated for perpendicular (TE) and transverse (TM) polarization. The CEM model may be evaluated for its directional response, transmission efficiency, and retroreflection efficiency.

FIG. 4B shows an example evaluation of the CEM model comprising the retroreflective metasurface of FIG. 1 in accordance with an illustrative embodiment. In FIG. 4B, a CEM model 410 is generated from a set of unit cells 402 that is repeatedly placed along a 1-D axis. As shown in diagram 412, the analysis determines the retroflection amplitude via a scattering analysis as a function of frequency 414 and incident angle 416.

Example Metasurface Tape

Figures 5A, 5B:
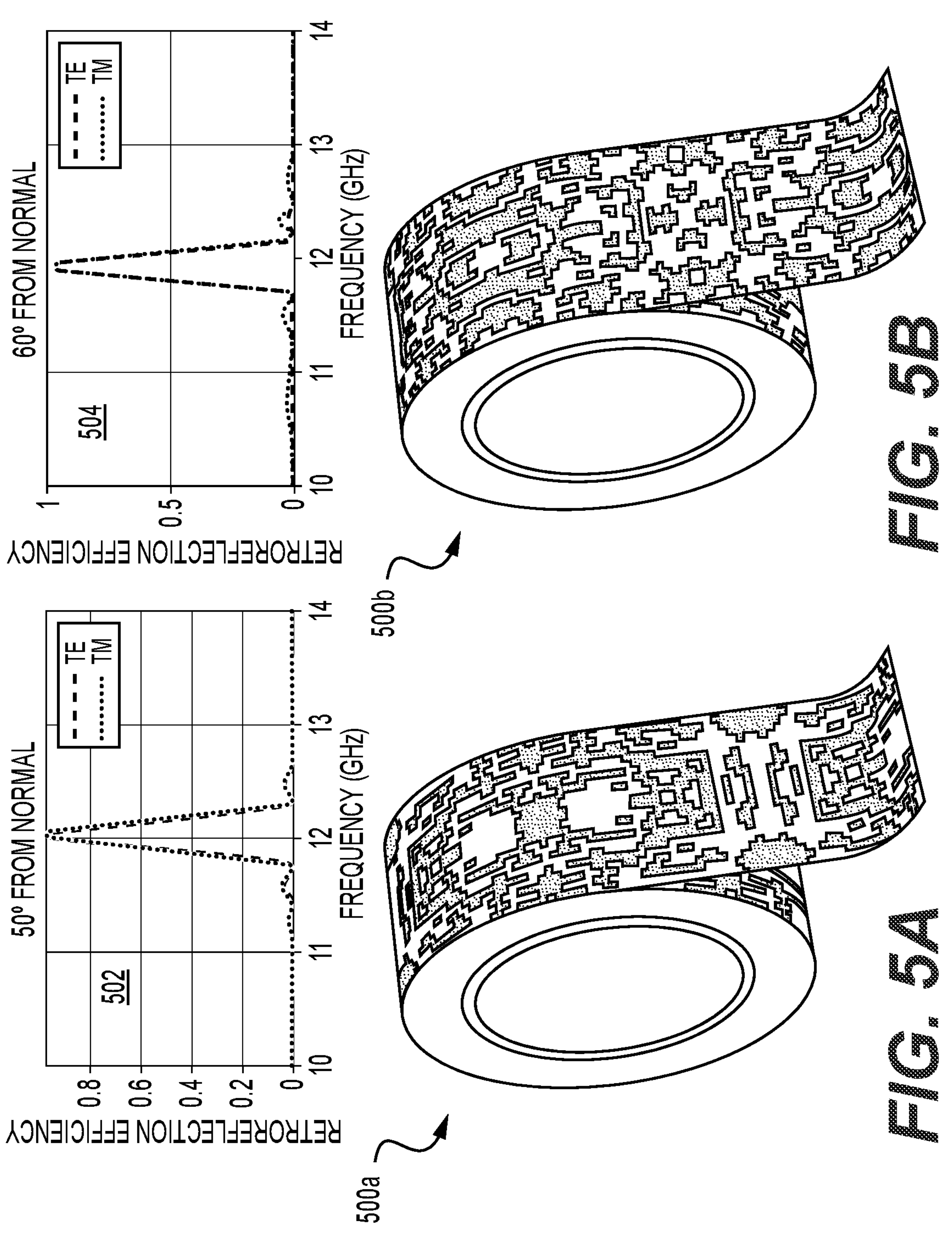
FIGS. 5A-5D show an example set of metasurface retroreflection tape having a fragmented or pixelated-array metasurface metalized pattern fabricated thereon in accordance with an illustrative embodiment.
Figures 5C, 5D:
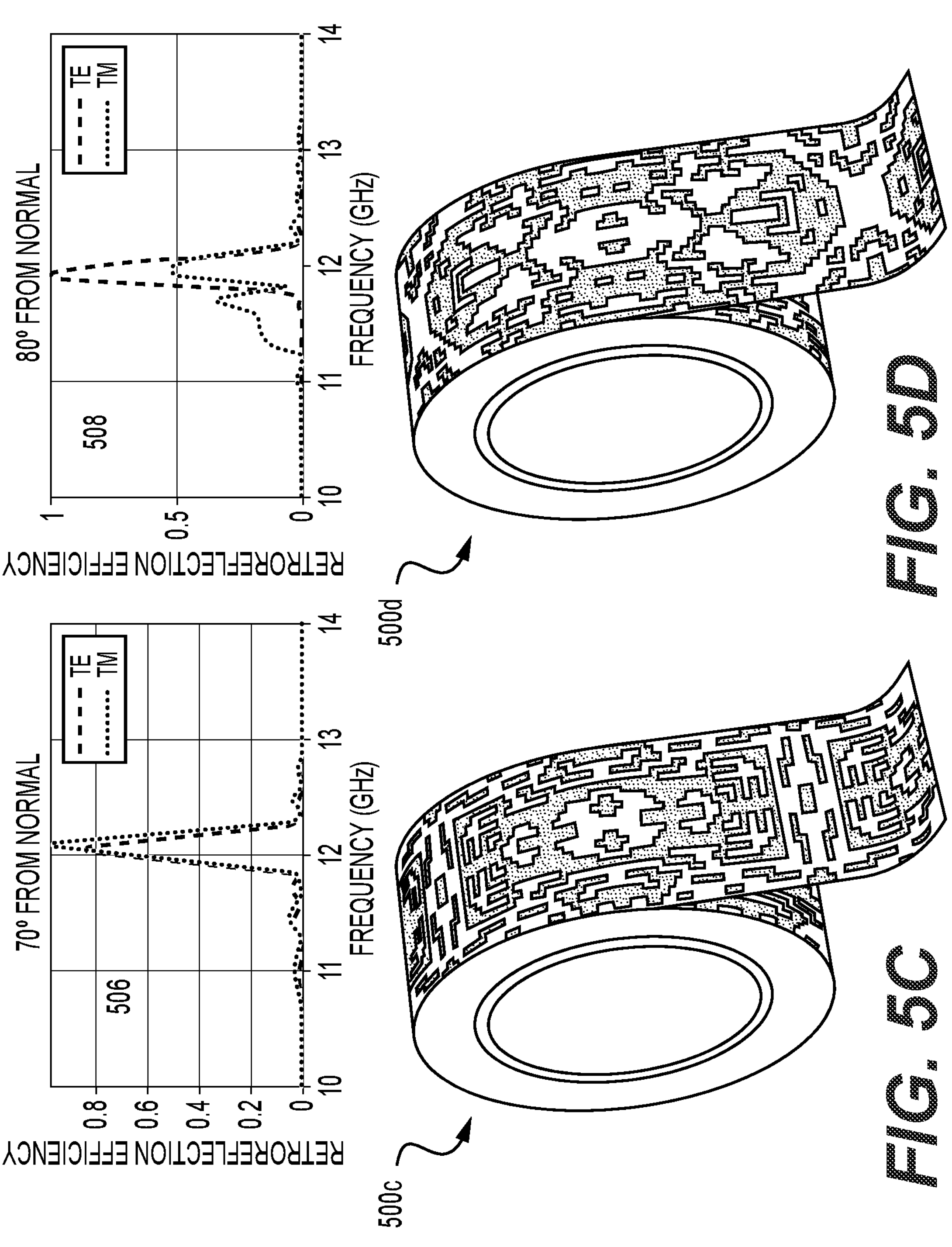

FIGS. 5A-5D show an example set of metasurface retroreflection tape 500 (shown as 500*a*, 500*b*, 500*c*, and 500*d*) having a fragmented or pixelated-array metasurface metalized pattern fabricated thereon. In this example, each of the metasurface retroreflection tapes 500*a*, 500*b*, 500*c*, 500*d* are configured to operate on a frequency range centered around 12 GHz. The metasurface retroreflection tape 500*a*, 500*b*, 500*c*, 500*d* were fabricated using the process described in relation to FIG. 3 though for a different respective angle of incident, including 50° from normal (FIG. 5A), 60° from normal (FIG. 5B), 70° from normal (FIG. 5C), and 80° from normal (FIG. 5D).

The retroreflection efficiency of each design is shown in plots 502, 504, 506, and 508. Each of the plots 502-508 shows the TE and TM polarization for the given metasurface retroreflection tape 500*a*, 500*b*, 500*c*, 500*d*.

The metasurface tape provides an example of a fragmented or pixelated-array metasurface employed for radio frequency (RF) tagging. In an example application, the fragmented or pixelated-array metasurface may be implemented to RF tagging surface of an unmanned aerial vehicle. The fragmented or pixelated-array metasurface can provide enhanced retroreflective directional return of control signals sent from a user or source controller. The enhanced transmissivity characteristics of the fragmented or pixelated-array metasurface can improve the range of the operation of the unmanned aerial vehicle in this example application.

Similar implementations can be provided for roadway signage or signaling devices. Enhanced optical or RF tagging could also be beneficial for autonomous control of unmanned vehicles in automated applications for warehouses and distribution centers.

Dual Polarization Fragmented or Pixelated-Array Metasurface

Figure 6A:
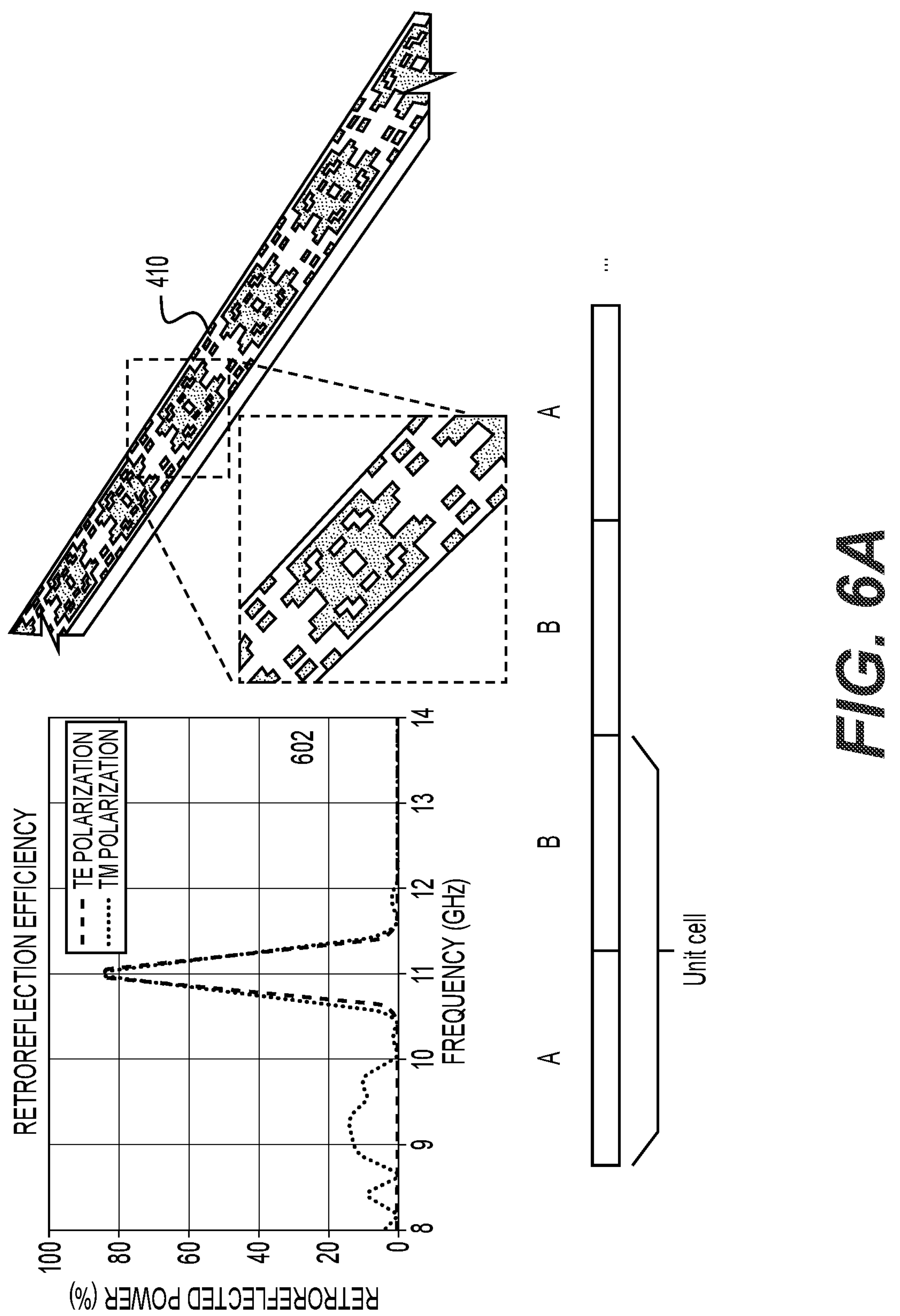
FIG. 6A shows an example fragmented or pixelated-array metasurface configured for dual-polarization operation in accordance with an illustrative embodiment.

FIG. 6A shows an example fragmented or pixelated-array metasurface configured for dual-polarization operation. In the example shown in FIG. 6A, the CEM model 410 comprising unit cell 402 of FIG. 4B is shown along with plot 602 of the retroreflection efficiency performance of the design. In plot 602, it can be observed that the CEM model 410 has a pattern with metalized patterns optimized for dual polarization—that is, the TE polarization 604 and the TM polarization 606 are generally overlapping to one another.

The unit cells have an “A-B-B-A” configuration that is repeated.

Dual Band Fragmented or Pixelated-Array Metasurface

Figure 6B:
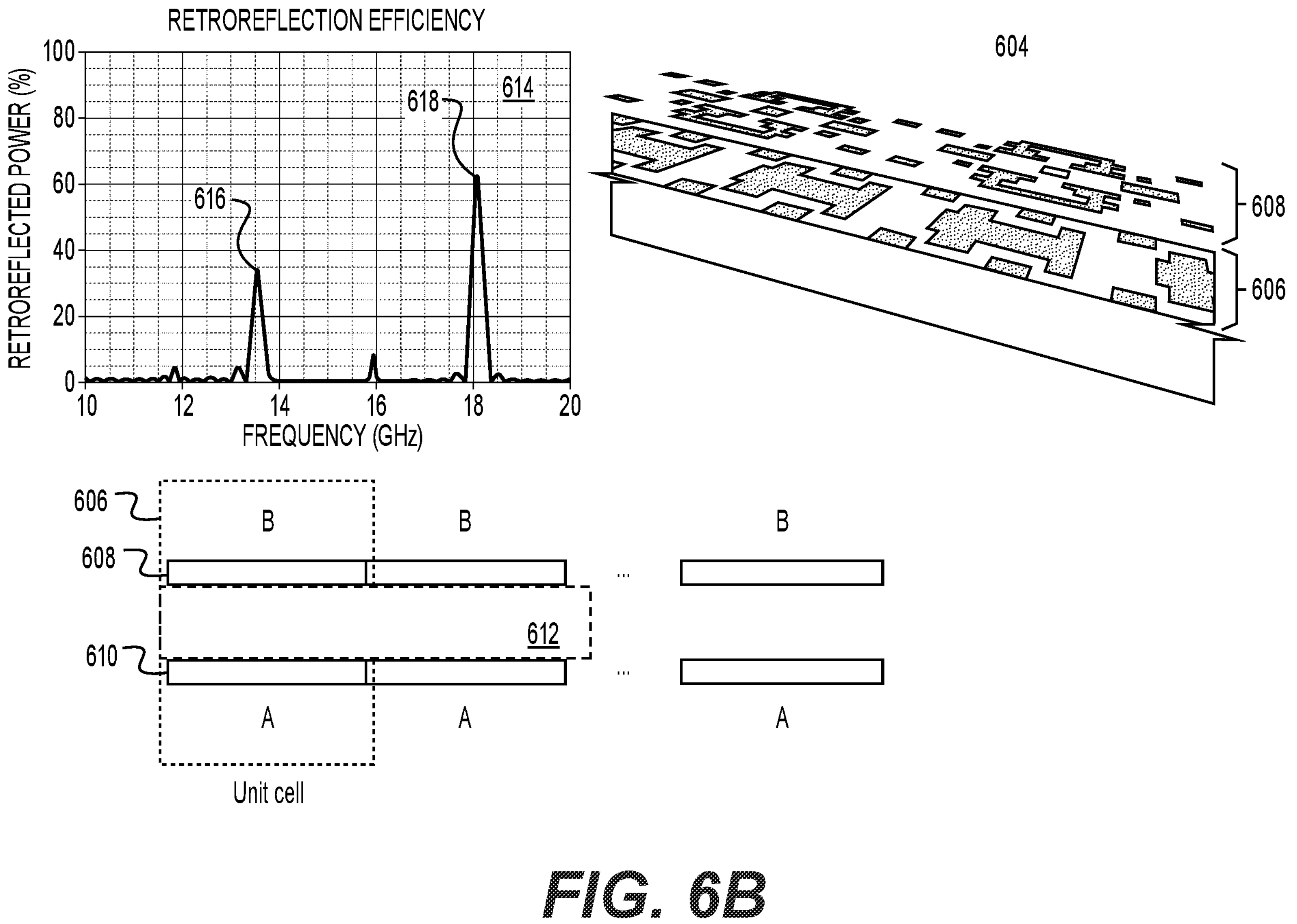
FIG. 6B shows an example fragmented or pixelated-array metasurface configured for dual-band operation in accordance with an illustrative embodiment.

FIG. 6B shows an example fragmented or pixelated-array metasurface configured for dual-band operation. The dual-band fragmented or pixelated-array metasurface can be employed with the increased bandwidth of the retroreflection. The composite structures may be made up of multiple patterns with different periodicities in which the layer patterns are tuned for different frequencies.

In the example shown in FIG. 6B, a second CEM model 604 comprising unit cell 606 comprising subcells 608 and 610 disposed over one another across a transparent substrate 612 is shown. For illustrative purposes, the PCB material between the two patterned layers is not shown in the image.

The subcells are repeated in “A-A-A . . . ” and “B-B-B . . . ” configurations for each of the layers. Other configurations may be employed.

In plot 614, it can be observed that the CEM model 604 has a pattern with subcell patterns optimized for dual-band operation at about 13.5 GHZ (616) and 18 GHz (618). That is, when the structure is illuminated by electromagnetic energy at 13.5 GHZ, the bottom patterned layer serves as a ground plane, and the top patterned layer is tuned to suppress specular reflection. And when illuminated at 18 GHZ, the top layer is transparent, and the bottom patterned layer is tuned to suppress specular reflection. The metalized back side of the entire structure can serve as the ground plane at this frequency.

Multiple bands of retroreflection may be configured in this manner. In some embodiments, multiple unit cells may be employed across two or more layers, e.g., “A-B-C-D” across layer 1 and “B-A-D-C” across layer 2.

Broadband Fragmented or Pixelated-Array Metasurfaces

Figure 6C:
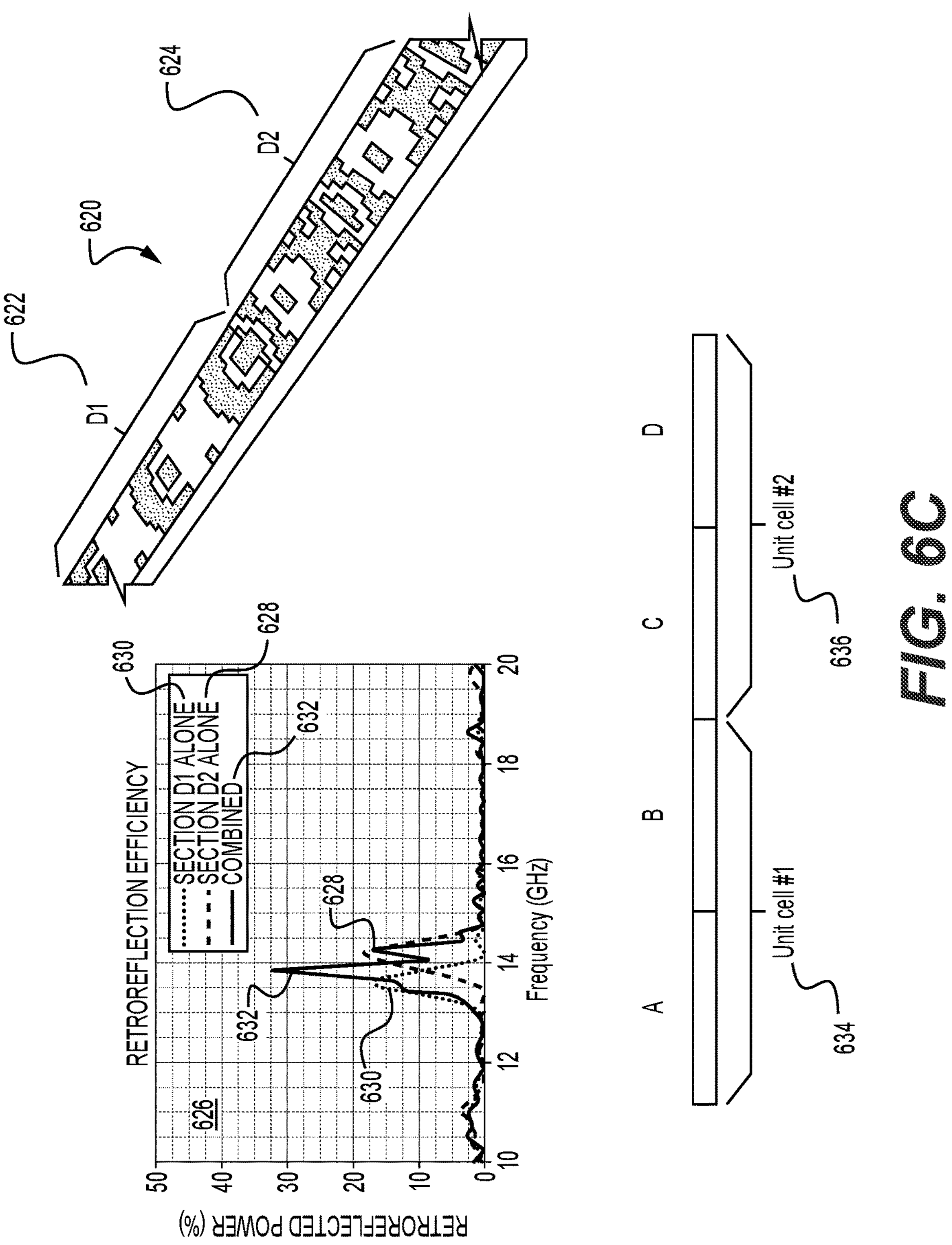
FIG. 6C shows an example having multiple fragmented or pixelated-array metasurfaces configured for broadband operation in accordance with an illustrative embodiment.

FIG. 6C shows an example having multiple fragmented or pixelated-array metasurfaces configured for broadband operation. The broadband metasurface includes fragmented or pixelated-array metasurface 634, 336 with different periodicities that are arranged in a side-by-side configuration on the same (or generally the same) layer. In the example shown in FIG. 6C, a CEM model 620 of a fragmented or pixelated-array metasurface structure includes a first fragmented or pixelated-array metasurface subcell 622 (shown as "D1" 622) and a second fragmented or pixelated-array metasurface subcell 624 (shown as "D2" 624).

In plot 626, it can be observed that the second subcell 624 has a pattern optimized for operation at slightly above 14 GHz (628), and the first subcell 622 has a pattern optimized for operation at slightly above 14 GHZ (630). And as combined side by side on the structure, the two fragmented or pixelated-array metasurfaces give rise to more broadband retroflection spectra (632).

It can be observed that the overall efficiency is lower than the single-frequency design (FIG. 6A) or dual-frequency (FIG. 6B) because only half of the available area can be used for each pattern. This technique can be readily extended by adding additional sections that operate at other frequencies, increasing the bandwidth at the cost of efficiency.

Figure 7A:
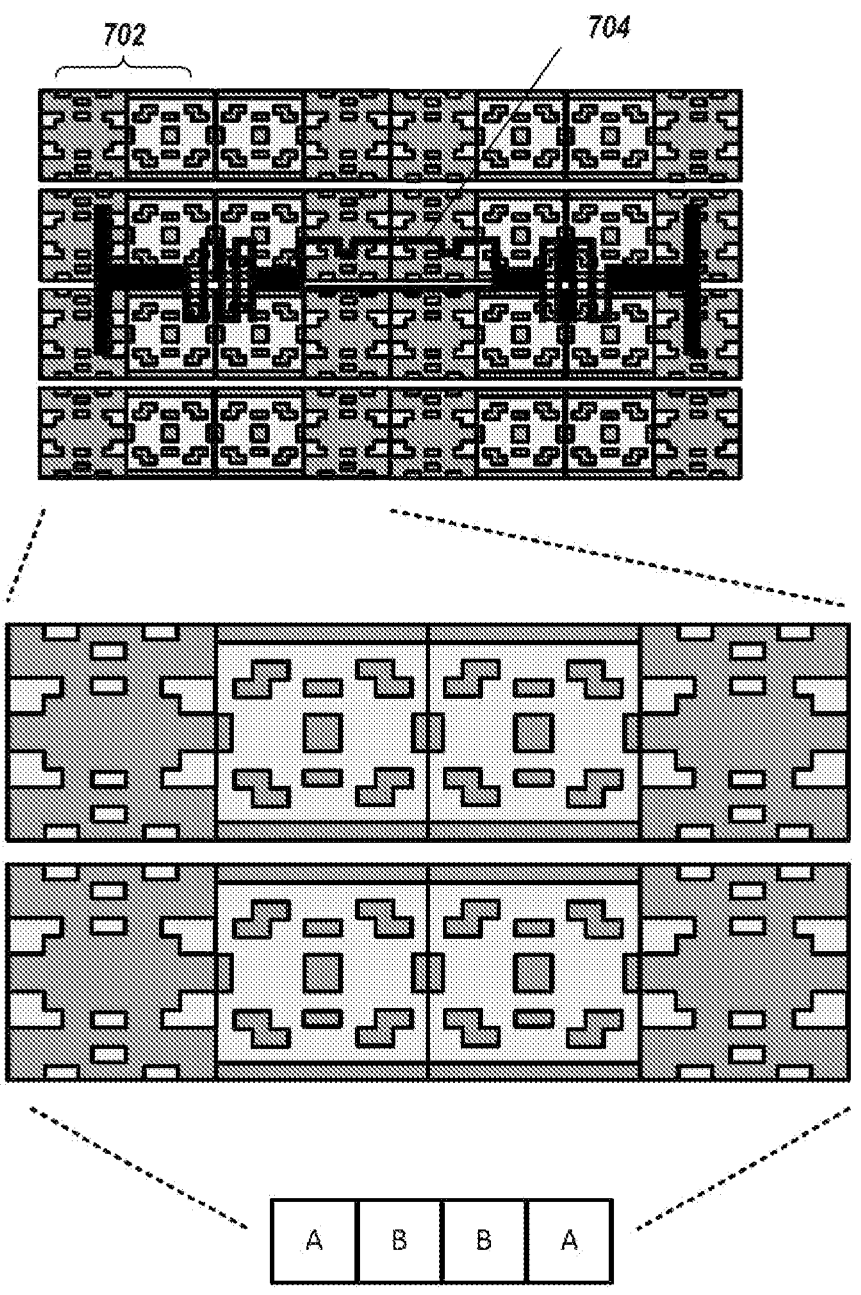
FIGS. 7A-7C show examples of the radio-frequency identification (RFID) tags configured with fragmented or pixelated-array metasurfaces in accordance with an illustrative embodiment.
Figure 7B:
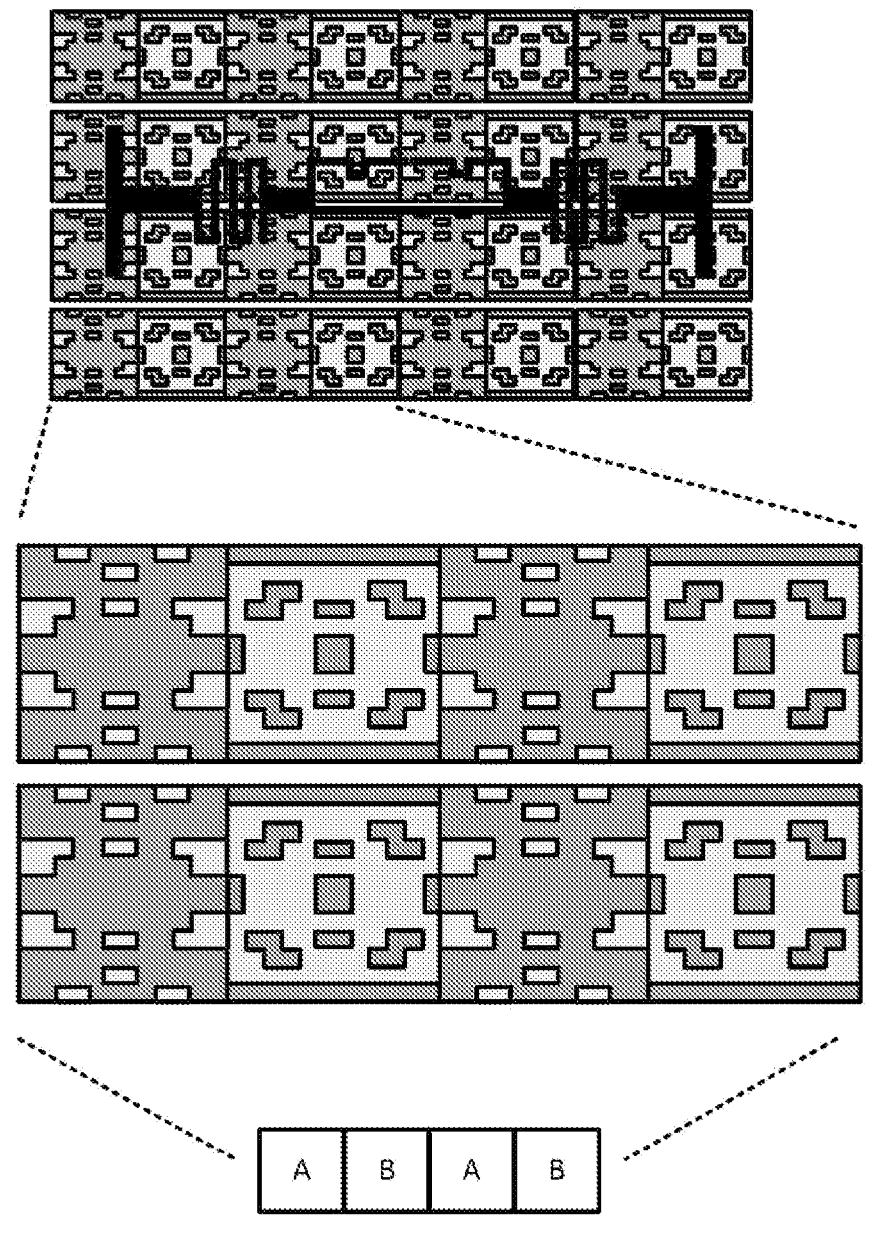
Figure 7C:
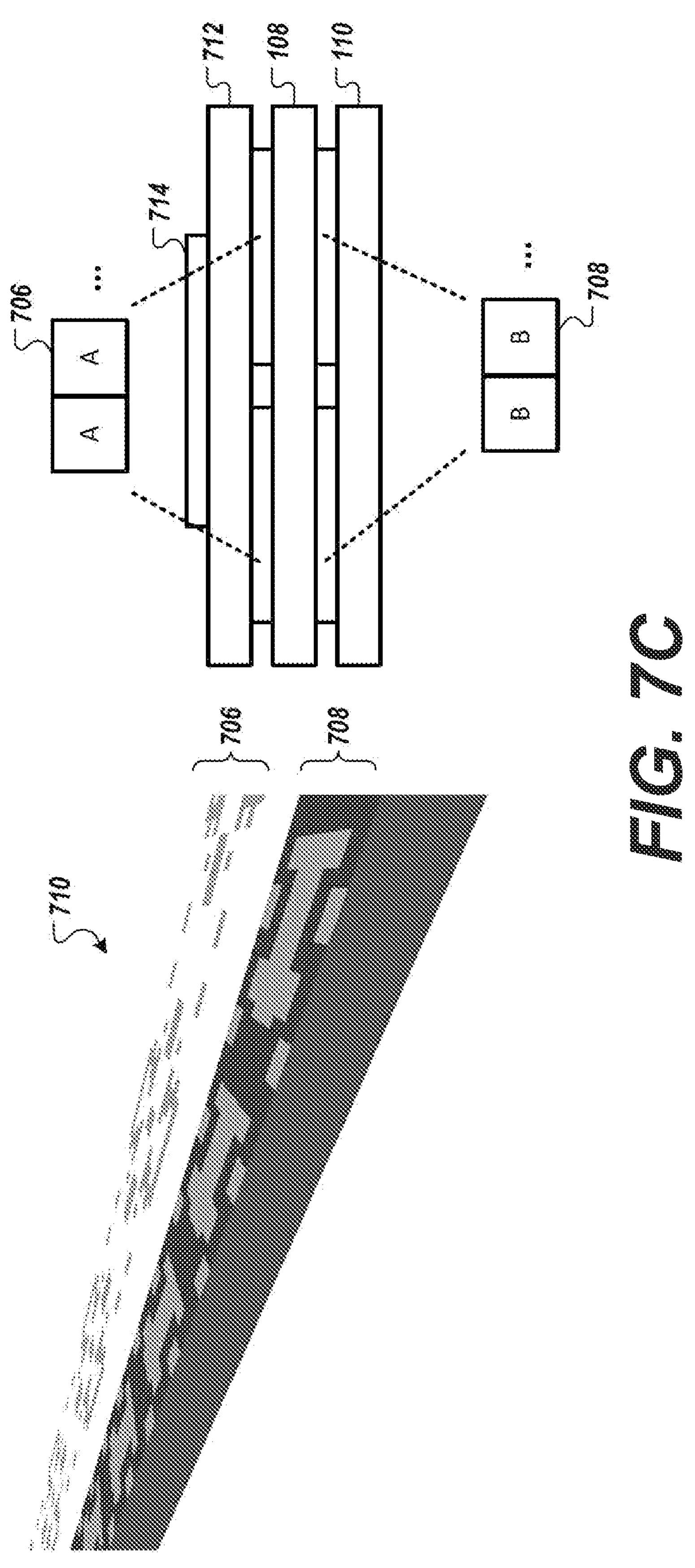

Example Radio Frequency Identification (RFID) Tag With Fragmented or Pixelated-Array Metasurfaces FIGS. 7A-7C show example of the radio-frequency identification (RFID) tags 700 (shown as 700*a*, 700*b*, 700*c*) configured with fragmented or pixelated-array metasurfaces 102. In FIG. 7A, the RFID tag 700*a* shows the fragmented or pixelated-array metasurfaces 102 of FIG. 1 arranged in a 4×4 array of unit cells 702 that operates in combination with an RFID circuit 704. The subcells of unit cell 702 are configured in an "A-B-B-A" configuration for each of the 4 rows. FIG. 7B shows the same fragmented or pixelated-array metasurfaces 102 of FIG. 1 also arranged in a 4×4 array. In FIG. 7B, the subcells of unit cell 702 are configured in an "A-B-A-B" configuration for each of the 4 rows.

FIG. 7C shows a fragmented or pixelated-array metasurfaces 102 in which the subcells are arranged in a stacked configuration. In the stacked configuration, the substrate 108 includes retroreflective metasurface 102 (shown as 706, 708) on both surfaces. In diagram 710, the separate first fragmented or pixelated-array metasurface subcell 706 and second fragmented or pixelated-array metasurface subcell 708 are shown. In the example shown in FIG. 7C, the RFID circuit element 714 is fabricated on a second substrate 712 (e.g., rigid or flexible printed circuit board) which is operatively coupled to the substrate 108.

The RFID tag may be configured as a passive device or an active device. The RFID tag with the fragmented or pixelated-array metasurfaces (e.g., 702) may be configured to provide directionality, via the retroreflection, of an interrogated signal provided from an RFID scanner to provide a return retroreflected signal to the source. Retroreflective responses in a different direction other than normal can provide a larger window of operation of the device, i.e., the angle that the device would have increased, increasing transmission efficiency and polarization.

3D Structure with Fragmented or Pixelated-Array Metasurfaces

Figures 8A, 8B:
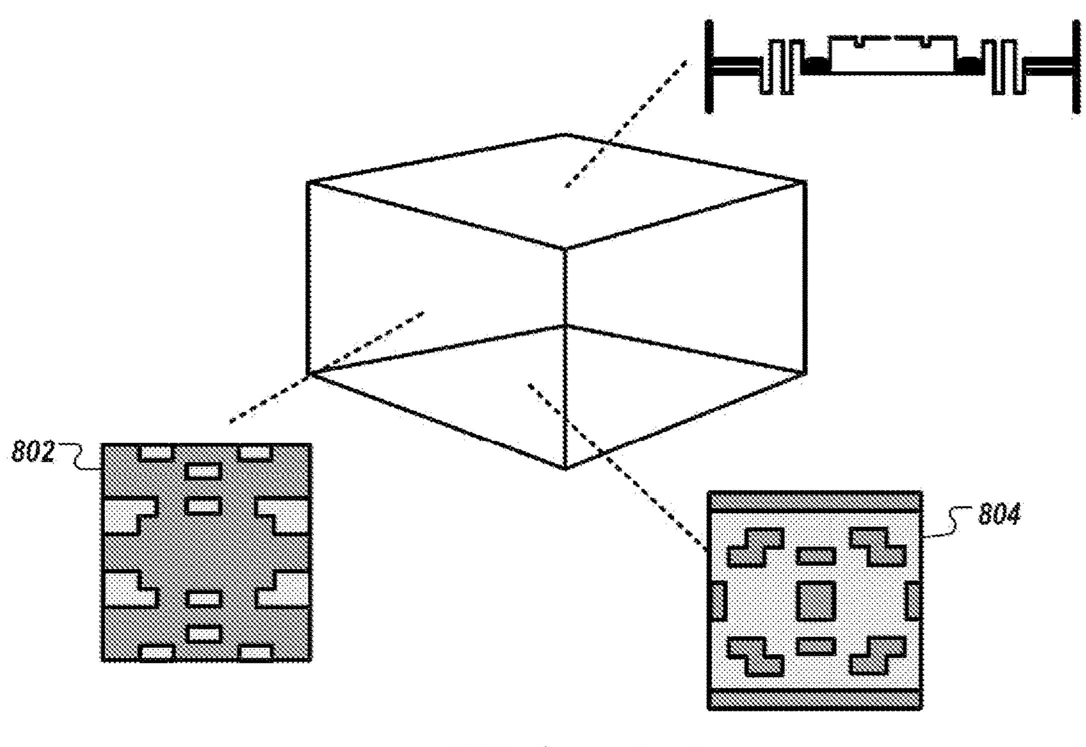
FIGS. 8A and 8B show an example configuration of the fragmented or pixelated-array metasurfaces employed in a 3D structure in accordance with an illustrative embodiment.

FIGS. 8A and 8B show an example configuration of the fragmented or pixelated-array metasurfaces (e.g., 102) employed in a 3D structure 800, e.g., for optical or RF tagging, passive and active antenna systems, or the like. In FIG. 8A, the subcells may be placed in a 3D configuration to one another—that is, the subcells (802, 804) may be placed orthogonal or one another.

FIG. 8B shows two sets of unit cells (shown 806 and 808) of fragmented or pixelated-array metasurfaces are shown each being arranged in an [3×5] array on a first surface 810 and second surface 812 of the 3D structure 814. In this example, a circuit element 816 (shown as an RFID circuit) is shown disposed on a third surface 818.

Experimental Results and Examples

A study was conducted to develop and evaluate the retroreflecting fragmented or pixelated-array metasurfaces described herein. In the study, fragmented or pixelated-array metasurfaces were designed and fabricated on printed circuit board material with copper plating on one side (the ground plane) and patterned copper features on the other side. Several retroreflecting fragmented or pixelated-array designs were simulated. In addition, fragmented or pixelated-array metasurfaces on fabricated on a tape, e.g., the metasurface retroreflection tape as described in relation to FIG. 5.

Prototype fragmented or pixelated-array metasurfaces. The study fabricated an 18"×24" prototype metasurface using standard PCB techniques on an 0.125" thick FR4 substrate. This structure was designed for retroreflection at 70 degrees at 12 GHz. Retroreflection from the structure was characterized. The sample was mounted on a foam column and rotated in the range. Retroreflection was measured from −90 degrees to 90 degrees and is plotted in comparison with a reference metal plate of the same lateral dimensions.

The size of the elements in the arrays (the unit cells) was specified such that only two modes are available for energy to be scattered into: the m=0 (specular) and m=−1 (retroreflective). These unit cells were then subdivided in half, and the pattern for the top-layer copper of each half-cell was then co-designed such that the reflection of the m=0 mode is 180° out of phase at the angles and frequencies of interest. This condition forced the m=0 mode to be suppressed, and because of the periodicity of the structure, only the m=−1 mode is available.

Figures 9A, 9B:
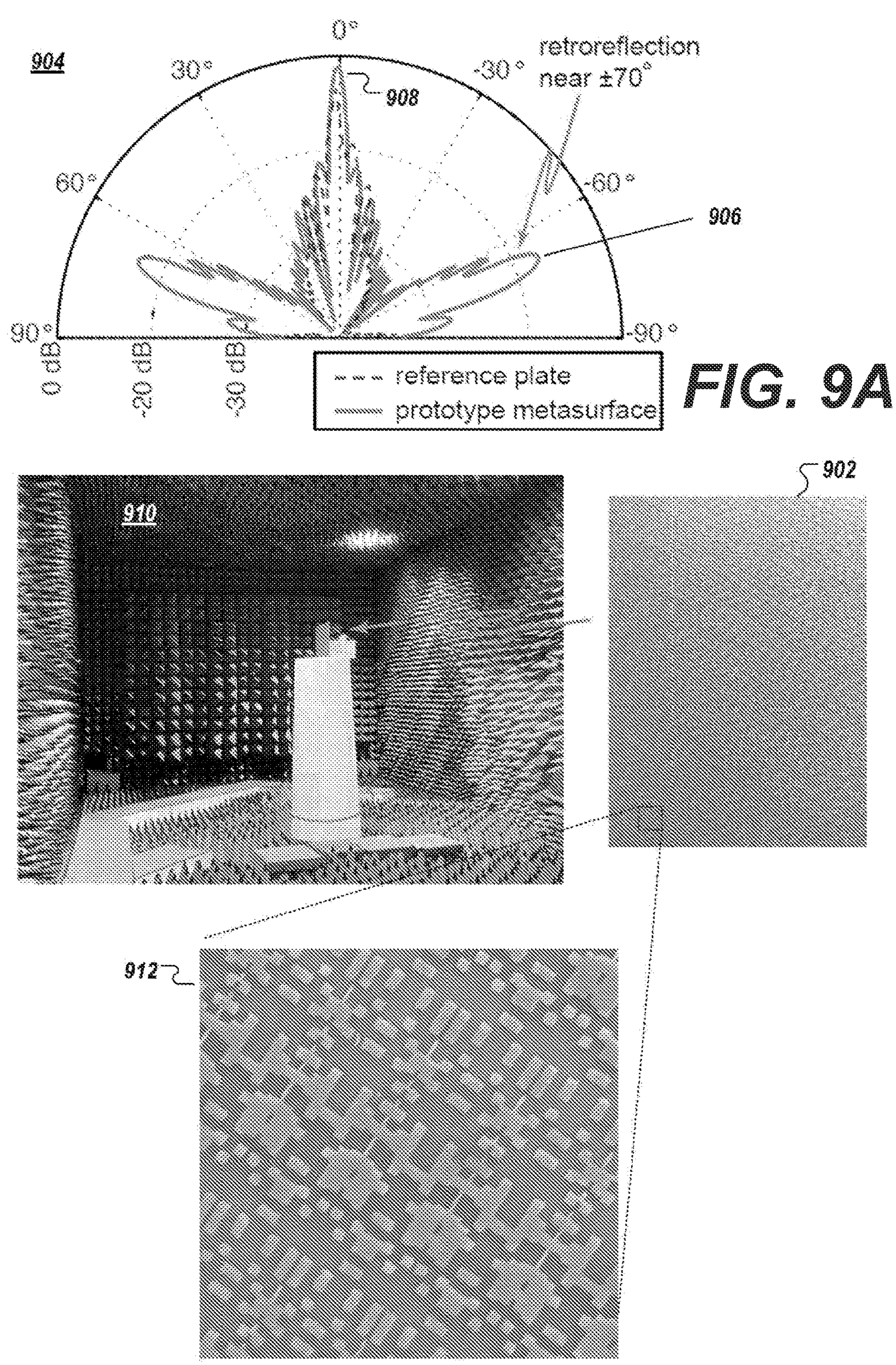
FIGS. 9A and 9B show the retroreflective performance of a prototype system in accordance with an illustrative embodiment.

FIGS. 9A and 9B show the retroreflective performance of the prototype system 902. In plot 904, it can be observed that the retroreflection transmission does occur at 70 degrees 906 for a 12-GHz signal in addition to reflection at normal 908. The evaluation setup is shown in diagram 910 with the prototype setup in an anechoic chamber. An enlarged view of the prototyped metasurface is shown in diagram 912.

Simulations. Design investigations identified several configuration and design approaches for developing fragmented or pixelated-array metasurfaces. Results were demonstrated for all three configurations. The designs were tuned for retroflection in the 2-18 GHz band and at 63° to allow for characterization in a free space-focused beam system.

The first design strategy is straightforward and achieved good results for extending the single polarization results in the literature to dual polarization. In this design, the study used a base design having canonical shapes and replaced the canonical shapes with optimizer-tuned metallization patterns. An example result and the corresponding geometry are shown in FIG. 6A. This structure was designed for backscatter at 63° incidence and showed good efficiency for both polarizations.

To increase the bandwidth of the retroreflection, the study evaluates a composite structure made up of multiple patterns with different periodicity. In one configuration, the study used layer patterns that were tuned for different frequencies. An example result and the corresponding geometry are shown in FIG. 6B.

When this structure is illuminated by EM energy at 13.5 GHz, the bottom patterned layer serves as a ground plane, and the top patterned layer is tuned to suppress specular reflection. When illuminated at 18 GHz, the top layer was transparent, and the bottom patterned layer was tuned to suppress specular reflection. The metalized back side of the board serves as the ground plane at this frequency.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include one particular value and/or the other particular value.

By "comprising" or "containing" or "including," is meant that at least the name compound, element, particle, or method step is present in the composition or article or method but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The following patents, applications, and publications, as listed below and throughout this document, are hereby incorporated by reference in their entirety herein.

[1] Wong, A. M. H., Christian, P., & Eleftheriades, G. V. (2018). Binary Huygens' Metasurfaces: Experimental Demonstration of Simple and Efficient Near-Grazing Retroreflectors for TE and TM Polarizations. IEEE Transactions on Antennas and Propagation, 66(6), 2892-2903.

What is clamied is:

1. An apparatus comprising:

a substrate defining a top layer of the apparatus, the substrate comprising a retroreflective metasurface comprising a plurality of unit cells defining a macro-pattern, each unit cell comprising two or more types of pixelated-array metasurfaces that define a sub-pattern within the respective unit cell, including a first pixelated-array metasurface and a second pixelated-array metasurface, the first pixelated-array metasurface and the second pixelated-array metasurface being configured to reflect a signal wavefront at a pre-defined range of angle of incidence to generate a scattered wavefront having a resulting first scattered wavefront portion and a second scattered wavefront portion that destructively cancel or interfere, in part, of one another to reduce specular mode of the scattered wavefront, wherein the first pixelated-array metasurface has a first pattern having a first associated periodicity, and wherein the second pixelated-array metasurface has a second pattern having a second associated periodicity; and a ground plane coupled to the substrate and defining a bottom layer of the apparatus, the ground plane having a reflective surface to the signal wavefront, wherein the top layer is transparent to a first frequency and retroreflective to a second frequency, and wherein the bottom layer functions at the second frequency and is retroreflective to the first frequency.

2. The apparatus of claim 1, wherein the first pixelated-array metasurface or second pixelated-array metasurface include a pixelated pattern comprising a plurality of pixel elements, each having a first reflective surface or a second reflective surface.

3. The apparatus of claim 1, wherein the first pixelated-array metasurface and the second pixelated-array metasurface are located on a same plane on the substrate.

4. The apparatus of claim 1, wherein the substrate is transparent to the signal wavefront, wherein the first pixelated-array metasurface is located on a first surface of the substrate, and wherein the second pixelated-array metasurface is located on a second surface of the substrate, and wherein the first surface is parallel to the second surface, and wherein the first pixelated-array metasurface overlaps with the second pixelated-array metasurface for the pre-defined range of angle of incidence.

5. The apparatus of claim 4, wherein the first surface is orthogonal to the second surface.

6. The apparatus of claim 4, wherein the first pixelated-array metasurface has a first retroreflective frequency characteristic and a transparent frequency characteristic, and wherein the second pixelated-array metasurface has a second retroreflective frequency characteristic.

7. The apparatus of claim 1, wherein the first pixelated-array metasurface and the second pixelated-array metasurface each has a size defined by wavelength parameter and an angle of incidence.

8. The apparatus of claim 1, wherein one or more of the plurality of unit cells are configured for dual-polarized retroreflection.

9. The apparatus of claim 1, wherein one or more of the plurality of unit cells are configured for single-polarized retroreflection.

10. The apparatus of claim 1, wherein one or more of the plurality of unit cells are configured for dual-band retroreflection, including a first retroreflection frequency range having a first center frequency and a second retroreflection frequency range having a second center frequency, and wherein the reduced specular mode of the scattered wavefront increases a bandwidth and angular range of retroreflectivity of the apparatus.

11. The apparatus of claim 1, wherein the first pixelated-array metasurface and the second pixelated-array metasurface collectively provide an overall response of the retroreflective metasurface as a weighted average of the first pixelated-array metasurface and the second pixelated-array metasurface.

12. The apparatus of claim 1, wherein the first pattern of the first pixelated-array metasurface and the second pattern of the first pixelated-array metasurface each comprises a binary Huygens metasurface.

13. The apparatus of claim 1, wherein the apparatus is configured as a passive or active radio-frequency identification (RFID) tag, optical or RF tagging device, or a smart surface for wireless communication.

14. The apparatus of claim 1, further comprising:

an electrical circuit component located in proximity to the retroreflective metasurface.

15. The apparatus of claim 1, wherein the first pixelated-array metasurface and the second pixelated-array metasurface are configured for steep angle operation, broad-or multi-band operation, dual-polarized operation, or low CSWAP (cost, size, weight, and power) operation.

16. The apparatus of claim 1, wherein the first pixelated-array metasurface and the second pixelated-array metasurface are configured to reflect the signal wavefront having visible light in a visible light portion of the electromagnetic spectrum.

17. The apparatus of claim 1, wherein the first pixelated-array metasurface and the second pixelated-array metasurface are configured to reflect the signal wavefront having a frequency in an RF portion of the electromagnetic spectrum.

18. The apparatus of claim 1, wherein the pre-defined range of angle of incidence is greater than 0 degrees and less than 90 degrees from normal, and wherein the first associated periodicity and the second associated periodicity establish an angle at which retroreflection is most efficient for a given frequency.

19. A system comprising:

an apparatus, the apparatus comprising:

a substrate defining a top layer of the apparatus, the substrate comprising a retroreflective metasurface comprising a plurality of unit cells defining a macro-pattern, each unit cell comprising two or more types of pixelated-array metasurfaces that define a sub-pattern within the respective unit cell, including a first pixelated-array metasurface and a second pixelated-array metasurface, the first pixelated-array metasurface and the second pixelated-array metasurface being configured to reflect a signal wavefront at a pre-defined range of angle of incidence to generate a scattered wavefront having a resulting first scattered wavefront portion and a second scattered wavefront portion that destructively cancel or interfere, in part, of one another to reduce specular mode of the scattered wavefront, wherein the first pixelated-array metasurface has a first pattern having a first associated periodicity, and wherein the second pixelated-array metasurface has a second pattern having a second associated periodicity; and a ground plane coupled to the substrate and defining a bottom layer of the apparatus, the ground plane having a reflective surface to the signal wavefront, wherein the top layer is transparent to a first frequency and retroreflective to a second frequency, and wherein the bottom layer functions at the second frequency and retroreflective to the first frequency; and a controller configured to interrogate the apparatus.

20. A method of fabricating the apparatus of claim 1, the method comprising:

setting a retroreflection angle of interest for a unit cell;

partitioning the unit cell into two or more parts;

modeling reflected fields from two subcells and computing a relative phase value between the subcell reflections of a current pattern;

varying patterns of the two subcells until the determined relative phase value of the current pattern of the two subcells is 180 degrees; and verifying design performance for the two subcells.

* * * * *